United States Patent
Eronen et al.

(10) Patent No.: US 11,546,718 B2
(45) Date of Patent: Jan. 3, 2023

(54) USE OF LOCAL LINK TO SUPPORT TRANSMISSION OF SPATIAL AUDIO IN A VIRTUAL ENVIRONMENT

(71) Applicant: Nokia Technologies Oy, Espoo (FI)

(72) Inventors: Antti Eronen, Tampere (FI); Arto Lehtiniemi, Lempaala (FI); Jussi Leppanen, Tampere (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/257,993

(22) PCT Filed: Jun. 25, 2019

(86) PCT No.: PCT/IB2019/055352
§ 371 (c)(1),
(2) Date: Jan. 5, 2021

(87) PCT Pub. No.: WO2020/012275
PCT Pub. Date: Jan. 16, 2020

(65) Prior Publication Data
US 2021/0274305 A1 Sep. 2, 2021

(30) Foreign Application Priority Data

Jul. 9, 2018 (EP) ...................... 8182332

(51) Int. Cl.
*H04S 7/00* (2006.01)
*H04W 4/029* (2018.01)
*H04R 5/04* (2006.01)
*H04W 4/02* (2018.01)
*H04W 40/20* (2009.01)
(Continued)

(52) U.S. Cl.
CPC ............... *H04S 7/305* (2013.01); *H04R 5/04* (2013.01); *H04W 4/023* (2013.01); *H04W 4/029* (2018.02); *H04W 40/20* (2013.01); *H04W 84/18* (2013.01); *H04W 88/04* (2013.01); *H04R 2420/07* (2013.01); *H04S 2400/11* (2013.01)

(58) Field of Classification Search
CPC ....... H04S 7/305; H04S 2400/11; H04R 5/04; H04R 2420/07; H04W 4/023; H04W 4/029; H04W 40/20; H04W 84/18; H04W 88/04; H04M 3/568
USPC ....................................... 455/569.1
See application file for complete search history.

(56) References Cited

U.S. PATENT DOCUMENTS

2011/0239136 A1* 9/2011 Goldman ............... G06N 3/006
715/757
2016/0085305 A1 3/2016 Spio
2017/0295531 A1 10/2017 Singh et al.

* cited by examiner

*Primary Examiner* — Eugene Yun
(74) *Attorney, Agent, or Firm* — Harrington & Smith

(57) ABSTRACT

A method including enabling a first user having a first user device to communicate with one or more second users having one or more second user devices via a network, wherein each user has a spatial position within a virtual space, such that, for each user within the virtual space, all other users within the virtual space have a relative spatial position; providing spatial audio data from the first user device to the one or more second user devices and receiving spatial audio data at the first user device from the one or more second user devices, such that each user is provided with audio from the other users in the respective relative spatial positions of the other users; and enabling a third user having a third user device to communicate with the first user and the one or more second users via the first user device.

19 Claims, 10 Drawing Sheets

(51) Int. Cl.
*H04W 84/18* (2009.01)
*H04W 88/04* (2009.01)

USE OF LOCAL LINK TO SUPPORT TRANSMISSION OF SPATIAL AUDIO IN A VIRTUAL ENVIRONMENT

TECHNICAL FIELD

The present specification relates to multi-user communications, for example to communications between a first user having a first user device and a second user having a second user device.

BACKGROUND

Systems are known to enable a first user having a first user device to communicate with a second user having a second user device via a network (such as a mobile communications network and/or the Internet). Moreover, such systems can provide audio outputs such that each user is presented with audio from the other systems in a relative spatial position of said other users within a virtual space.

SUMMARY

In a first aspect, there is provided an apparatus comprising: means for enabling a first user having a first user device to communicate with one or more second users having one or more second user devices via a network (such as a mobile communications network and/or the Internet), wherein each user has a spatial position within a virtual space, such that, for each user within the virtual space, all other users within the virtual space have a relative spatial position; means for providing spatial audio data from the first user device to the one or more second user devices and receiving spatial audio data at the first user device from the one or more second user devices, such that each user is provided with audio from the other users in the respective relative spatial positions of the other users; and means for enabling a third user having a third user device to communicate with the first user and the one or more second users via the first user device, wherein the means for enabling the third user to communicate comprises a local link (e.g. Bluetooth®) between the first and third user devices.

The first user device may send separate spatial audio data associated with the first and third users via the network.

The means for enabling the third user device to communicate may comprise a first handshaking protocol between the first and third user devices to initiate the local link. The handshaking protocol may be initiated by the first user and/or the third user.

The apparatus may further comprise means for enabling the third user to enter the virtual space, such that the third user has a relative spatial position within the virtual space. The means for enabling the third user to enter the virtual space may include means for presenting a virtual reality, augmented reality or mixed reality visualisation of the virtual space to the third user (a similar presenting means can be provided to the first and second users).

The apparatus may further comprise means for providing spatial audio data to the third user device such that the third user is provided with audio from the other users in the respective relative spatial positions of the other users and the other users are provided with audio from the third user from the relative spatial position of the third user.

In some embodiments, the audio of the third user is captured and transmitted to the other users by the first user device.

The means for receiving spatial audio at the first user device may comprise means for attenuating the audio of the third user.

The apparatus may further comprise: means (e.g. including a headset) for tracking a position and/or an orientation (e.g. 3 DoF or 6DoF position/orientation) of at least some of said users; and means for adjusting the relative spatial positions of the users within the virtual space accordingly.

The apparatus may further comprise means for enabling the third user to communicate with the first and the one or more second users via the network. In some embodiments, the means for enabling the third user device to communicate with the first and the one or more second user devices via the network may comprise a second handshaking protocol between the first and third user devices to initiate a link to the network and/or to deactivate the local link between the first and third user devices.

The apparatus may comprise means for providing additional audio content (e.g. music) to some or all of said users from an additional spatial position within the virtual space.

In a second aspect, this specification describes a method comprising: enabling a first user having a first user device to communicate with one or more second users having one or more second user devices via a network (such as a mobile communications network and/or the Internet), wherein each user has a spatial position within a virtual space, such that, for each user within the virtual space, all other users within the virtual space have a relative spatial position; providing spatial audio data from the first user device to the one or more second user devices and receiving spatial audio data at the first user device from the one or more second device users, such that each user is provided with audio from the other users in the respective relative spatial positions of the other users; and enabling a third user having a third user device to communicate with the first user and the one or more second users via the first user device, wherein the means for enabling the third user to communicate comprises a local link (e.g. Bluetooth®) between the first and third user devices. A first handshaking protocol may be provided between the first and third user devices to initiate the local link.

The first user device may send separate spatial audio data associated with the first and third users via the network.

The method may comprise enabling the third user to enter the virtual space (for example by presenting a virtual reality, augmented reality or mixed reality visualisation of the virtual space to the third user), such that the third user has a relative spatial position within the virtual space.

The method may comprise tracking a position and/or an orientation of at least some of said users and adjusting the relative spatial positions of the users within the virtual space accordingly.

The method may comprise enabling the third user to communicate with the first and the one or more second users via the network. For example, a second handshaking protocol may be provided between the first and third user devices to initiate a link to the network and/or to deactivate the local link between the first and third user devices.

In a third aspect, this specification describes an apparatus configured to perform any method as described with reference to the second aspect.

In a fourth aspect, this specification describes computer readable instructions which, when executed by computing apparatus, cause the apparatus to perform a method as described with reference to the second aspect.

In a fifth aspect, this specification describes a computer program comprising instructions for causing an apparatus to perform at least the following: enable at least a first user having a first user device and one or more second users have one or more second user devices to communicate via a network, wherein each user has a spatial position within a virtual space, such that, for each user within the virtual space, all other users within the virtual space have a relative spatial position; provide spatial audio data to the first and the one or more second users such that each user is provided with audio from the other users in the respective relative spatial positions of the other users; and enable a third user having a third user device to communicate with the first user and the one or more second users via the first user device, wherein the means for enabling the third user to communicate comprises a local link (e.g. Bluetooth®) between the first and third user devices.

In a sixth aspect, this specification describes a non-transitory computer readable medium comprising program instructions stored thereon for performing at least the following: enabling at least a first user having a first user device and one or more second users have one or more second user devices to communicate via a network, wherein each user has a spatial position within a virtual space, such that, for each user within the virtual space, all other users within the virtual space have a relative spatial position; providing spatial audio data to the first and the one or more second users such that each user is provided with audio from the other users in the respective relative spatial positions of the other users; and enabling a third user having a third user device to communicate with the first user and the one or more second users via the first user device, wherein the means for enabling the third user to communicate comprises a local link (e.g. Bluetooth®) between the first and third user devices.

In a seventh aspect, this specification describes an apparatus comprising: at least one processor; and at least one memory including computer program code which, when executed by the at least one processor, causes the apparatus to: enable at least a first user having a first user device and one or more second users have one or more second user devices to communicate via a network, wherein each user has a spatial position within a virtual space, such that, for each user within the virtual space, all other users within the virtual space have a relative spatial position; provide spatial audio data to the first and the one or more second users such that each user is provided with audio from the other users in the respective relative spatial positions of the other users; and enable a third user having a third user device to communicate with the first user and the one or more second users via the first user device, wherein the means for enabling the third user to communicate comprises a local link (e.g. Bluetooth®) between the first and third user devices.

BRIEF DESCRIPTION OF THE DRAWINGS

Example embodiments will now be described, by way of non-limiting examples, with reference to the following schematic drawings, in which.

DETAILED DESCRIPTION

Figure 1:
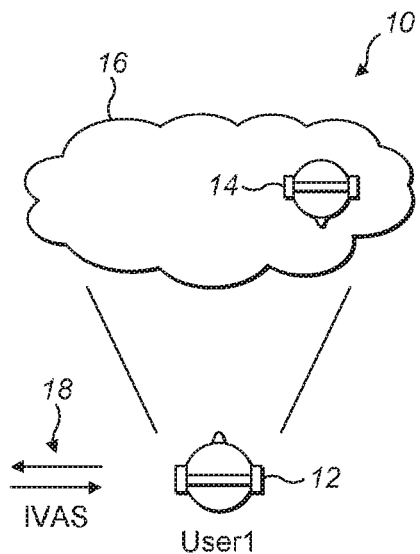
FIG. 1 is a block diagram of a system in accordance with an example embodiment.

FIG. 1 is a block diagram of a system, indicated generally by the reference numeral 10, in accordance with an example embodiment. The system 10 includes a first user 12. The first user 12 is wearing headphones (e.g. as part of a headset) that are being used to provide spatial audio data 16 to the first user via a network 18. The spatial audio data 16 includes audio data 14 from a second user (e.g. the user 22 described below). The first user 12 may use a mobile phone (or similar mobile communication device) to communicate using the network 18 and may use a microphone integrated into a headset to capture audio. As described in detail below, the spatial audio data is such that the audio data from the second user 14 is presented to the first user 12 at a spatial position within a virtual space.

Figure 2:
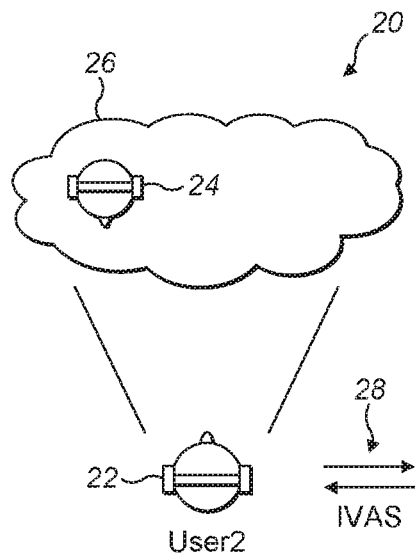
FIG. 2 is a block diagram of a system in accordance with an example embodiment.

FIG. 2 is a block diagram of a system, indicated generally by the reference numeral 20, in accordance with an example embodiment. The system 20 includes a second user 22. The second user 22 is wearing headphones that are being used to provide spatial audio data 26 (including spatial audio data 24 from the first user 12) to the second user via a network 28. The second user 22 may use a mobile phone (or similar mobile communication device) to communicate using the network 28 and may use a microphone integrated into a headset to capture audio. The spatial audio data is such that the audio data 24 from the first user is presented to the second user 22 at a spatial position within a virtual space.

It should be noted that whilst FIGS. 1 and 2 (and other arrangements described below) include users wearing headphones, this is not essential to all embodiments. For example, one or more loudspeakers rendering spatial audio may be provided.

Figure 3:
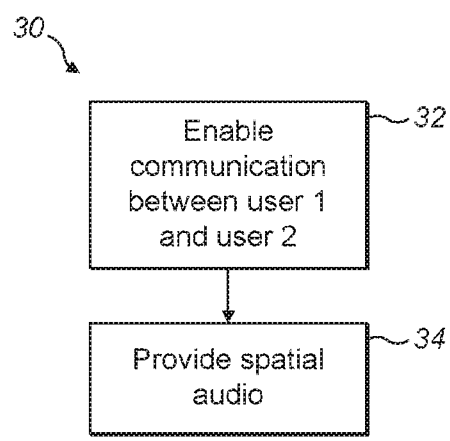
FIG. 3 is a flow chart showing an algorithm in accordance with an example embodiment.

FIG. 3 is a flow chart showing an algorithm, indicated generally by the reference numeral 30, in accordance with an example embodiment. The algorithm 30 shows an example use of the systems 10 and 20 described above.

The algorithm 30 starts at operation 32, where communications between the first user 12 and the second user 22 are enabled. The communications may take place using an immersive voice and audio services (IVAS) codec. Thus, the networks 18 and 28 shown in FIGS. 1 and 2 respectively may be IVAS communication networks. Of course, IVAS is provided by way of example only; other communication systems could be used in alternative embodiments.

The algorithm 30 moves to operation 34, where spatial audio data 16 and 26 are provided to the first and second users 12 and 22 respectively.

Figure 4:
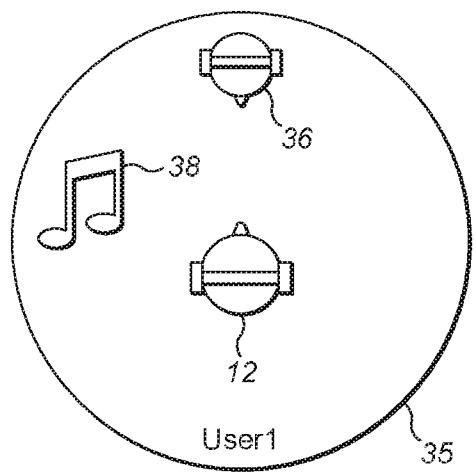
FIG. 4 is a block diagram of a virtual space in accordance with an example embodiment.

FIG. 4 is a block diagram of a virtual space 35 in accordance with an example embodiment. The first user 12 is in the centre of the virtual space 35 and receives audio data from various data sources within the virtual space. For example, audio 36 from the second user 22 can be provided to the first user 12 and positioned at a spatial position of the second user within the virtual space 35. Further, other audio content 38 (such as music) is presented at a different spatial position within the virtual space 35.

Audio presented to the first user 12 may be three-degrees-of-freedom (3DoF) audio. In this context, 3DoF refers to tracking the orientation of the head of a user, and processing audio accordingly. This enables binaural reproduction, where audio objects can be kept in their places in a world-coordinate system when a user moves his/her head, thereby improving an immersive experience. This is in contrast to traditional, non-tracked, headphone listening in which audio objects move unrealistically with head movement.

Six degrees of freedom (6DoF) adds also the tracking of the user position. 6DoF enables the positioning of virtual auditory objects in a virtual space, wherein the correct virtual position can be provided even if the user moves. This enables, for example, a user to move around an object located within a virtual space.

For example, the audio (e.g. voice) of the second user 22 may be fed to an IVAS encoder as an object with a certain direction, with an IVAS decoder of the first user 12 binauralising the audio of the second user 22 to that direction. Similarly, the audio of the first user 12 may be fed to an IVAS encoder as an object with a certain direction, with an IVAS decoder of the second user 22 binauralising the audio of the first user 12 to that direction. In this way, binaural reproduction is possible, where audio objects are presented in their places in a real-world co-ordinate system. The positioning of the presented audio can be non-tracked, 3DoF or 6Dof, depending, for example, on the capability of a mobile device and/or headphone capturing and/or outputting the audio content.

By way of example, users (such as the users 12 and 22 described above or any of the users described below) may be provided with headsets (or other devices) to track the orientation of the user's head and to process audio accordingly.

Figure 5:
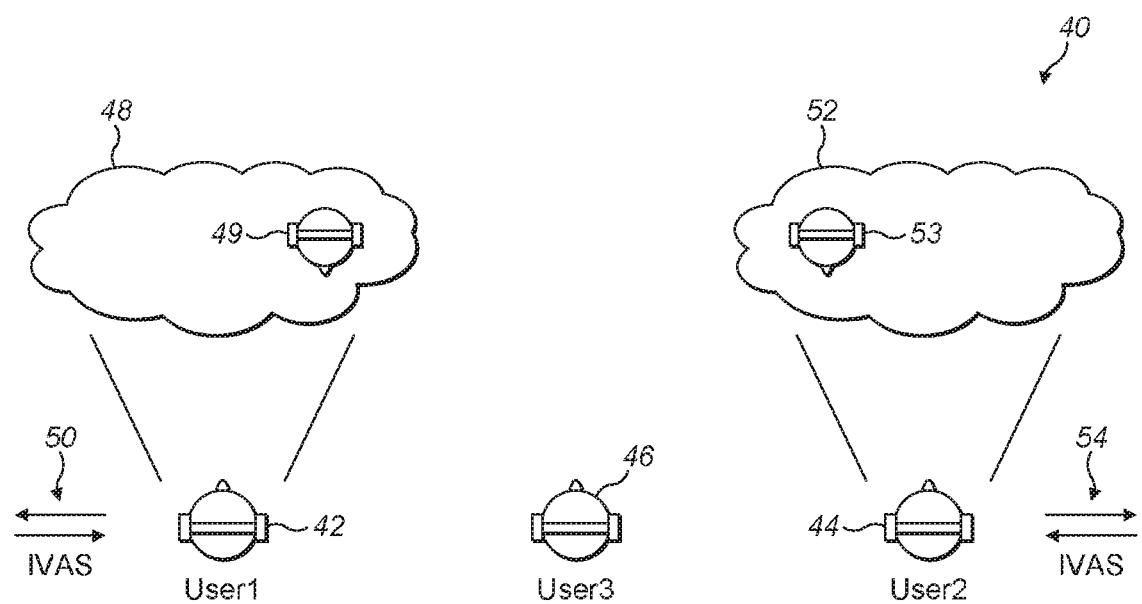
FIG. 5 is a block diagram of a system in accordance with an example embodiment.

FIG. 5 is a block diagram of a system, indicated generally by the reference numeral 40, in accordance with an example embodiment.

The system 40 comprises a first user 42 and a second user 44 (similar to the first user 12 and second user 22 described above). The system 30 also comprises a third user 46.

The first user 42 is provided with spatial audio data 48 via a first network 50. The spatial audio data 48 includes audio data 49 from the second user 44. Similarly, the second user 44 is provided with spatial audio data 52 via a second network 54. The spatial audio data 52 includes audio data 53 from the first user 42. Of course, the first network 52 and second network 54 may be a single network, such as an IVAS network, as described above.

The spatial audio data 48 and 52 are such that the audio data from the second user 44 is presented to the first user 42 at a spatial position within a virtual space and audio data from the first user 42 is presented to the second user 44 at a spatial position within a virtual space.

Assume that the third user 46 is in the vicinity of the first user 42 and wants to join an ongoing call between the first user 42 and the second user 44.

Figure 6:
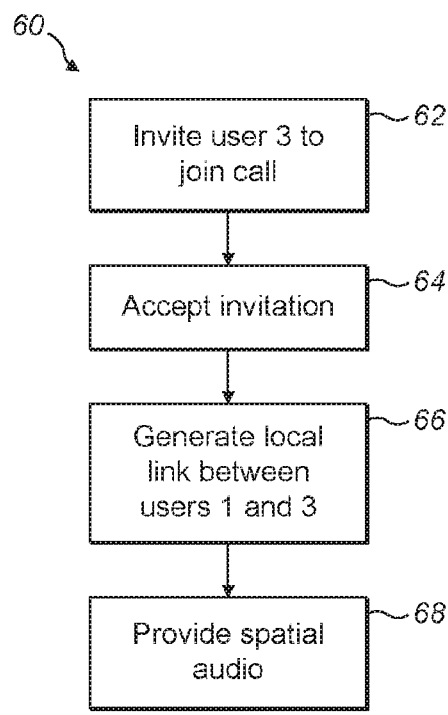
FIG. 6 is a flow chart showing an algorithm in accordance with an example embodiment.

FIG. 6 is a flow chart, indicated generally by the reference numeral 60, showing an algorithm in accordance with an example embodiment.

As shown in FIG. 6, the algorithm 60 starts at operation 62, where the third user 46 is invited (by the first user 42) to join the call. The third user 46 then accepts that invitation (operation 64).

At operation 66, a local link is generated between the first user 42 and the third user 46. As described below, the local link may be a Bluetooth® link, but this is not essential to all embodiments. Next, at operation 68, spatial audio is provided to and from the third user 46. Further details of the operation 68 are provided below.

The operations 62 and 64 could be implemented in many different ways. One possible arrangement is described below; other methods will be apparent to those skilled in the art.

It should be noted that the algorithm 60 is initiated by the first user 42 sending a request to the third user 46. This is not essential to all embodiments. For example, the third user 46 could request access to the communication, without waiting to be invited by the first user.

The operation 62 may be implemented by the first user 42 pointing a mobile device camera towards the third user 46 (e.g. using the mobile device that is being used to implement the call with the second user). Using augmented reality (AR) visualisation, the mobile device of the first user 42 can determine that the mobile device of the third user 46 is compatible with local IVAS calls via Bluetooth®. This may be realised by showing a suitable icon on top of the mobile device of the third user. The mobile device of the first user 42 receives availability information from the device of the third user (e.g. via Bluetooth®). The first user 42 clicks on icon and the mobile device of the first user sends a request to the mobile device of the third user (thereby completing operation 62 of the algorithm 60). In some embodiments, at least some of these features may be reversed. For example, the operation may be implemented by the third user 46 pointing a mobile device camera towards the first user 42 (e.g. using the mobile device that is being used to implement the call with the second user). The mobile device of the third user 46 may determine that the mobile device of the first user 42 is compatible with local IVAS calls via Bluetooth® (for example by showing a suitable icon on top of the mobile device of the first user). The mobile device of the third user 46 may receives availability information from the device of the first user (e.g. via Bluetooth®). The third user 46 may click on icon and the mobile device of the third user may send a request to the mobile device of the first user.

In response to receiving the request from the first user, the third user 46 may be presented with a visualisation (such as an augmented reality visualisation) of the call contents of the first user 42.

Figure 7:
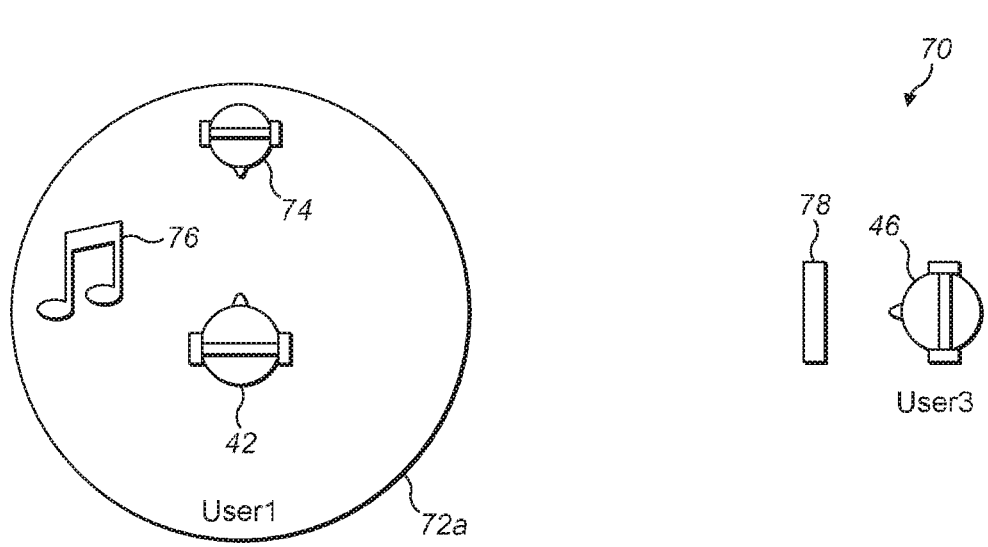
FIG. 7 is a block diagram of a system in accordance with example embodiments.

FIG. 7 is a block diagram of a system, indicated generally by the reference numeral 70 in accordance with an example embodiment. The system 70 comprises a virtual space 72a that forms the call contents of the first user 42. The virtual space 72a comprises the first user 42, audio 74 from the second user 44 and other audio content (such as music) 76.

The system 70 also comprises a screen 78 that provides visualisation (such as an augmented reality visualisation) of the virtual space 72a to the third user 46. The third user 46 can inspect the visualisation from different directions from outside the virtual space. The third user 46 may be able to hear the audio scene in a preview mode. The third user 46 can then decide whether (and where) to enter the virtual space. The operation 64 of the algorithm 60 may be completed by entering the virtual space.

Figure 8:
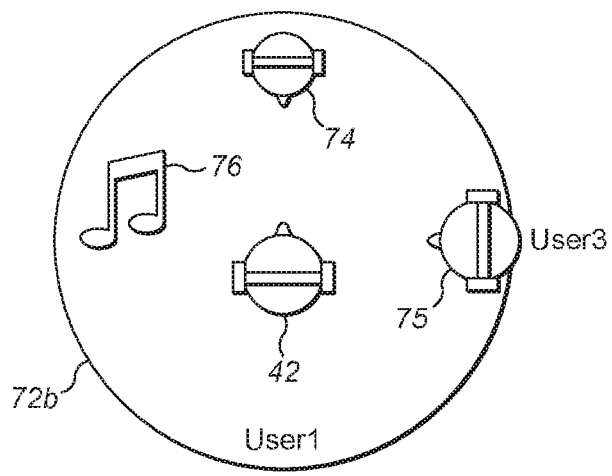
FIG. 8 is a block diagram of a virtual space in accordance with an example embodiment.

FIG. 8 is a block diagram of a system, indicated generally by the reference numeral 72b in accordance with an example embodiment. The system 72b comprises a first user 42, audio 74 from the second user 44 and other audio content (such as music) 76. The system 72b also comprises audio 75 from the third user 46. The audio 75 is heard (by the first user 42) coming from the spatial direction in which the third user 46 entered the virtual space 72a.

Figure 9:
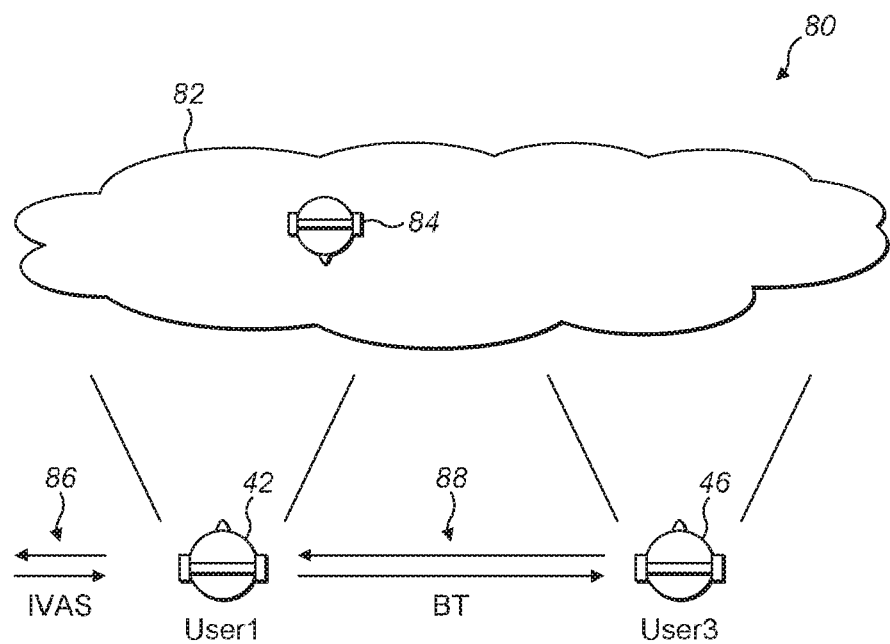
FIGS. 9 and 10 are block diagrams of systems in accordance with an example embodiment.

FIG. 9 is a block diagram of a system, indicated generally by the reference numeral 80, in accordance with an example embodiment.

The system 80 includes the first user 42 and the third user 46 described above. The first user 42 is provided with spatial audio data 82 including spatial audio data 84 for the second user 44. The spatial audio data 82 is provided to the first user 42 using first communication system 86 (such as an IVAS communication). The spatial audio data 82 is provided from the first user 42 to the third user 46 via a local link 88 (such as a Bluetooth® link).

The spatial audio data 82 is such that the audio data 84 from the second user 44 is presented to the first user 42 at a spatial position within a virtual space. Further, by means of the local link 88, the spatial audio data 82 is also presented to the third user 46.

As described above, having accepted the invitation (operation 64 of the algorithm 60), the Bluetooth® link 88 is established between the first user 42 and the third user 46. In common with the first and second users, the third user 46 reproduces audio (e.g. using headphones) and captures audio using (e.g. using a microphone, such as a mobile phone microphone). The audio (e.g voice) of the third user 46 is transmitted to the first user via the Bluetooth® link 88. The first user 42 feeds the audio of the third user to the IVAS encoder as another object (different to the audio of the first user) in the direction of the third user. It should be noted that a single IVAS stream can be used, with two data objects (one for audio from the first user 42 and the other for audio from the third user 46). The said data objects may be audio data including direction information and possibly also distance information in some cases.

Before feeding the audio objects of the first user 42 and the third user 46 to the second user 44, audio processing (for example using a mobile device of the first user) may be implemented. The audio processing may be provided to mitigate the amount of audio coming from the third user 46 and vice-versa. For example the user device of the first user may attenuate audio from the third user (since that audio is being received from the third user via the local link). This enables the second user to receive audio objects that contain the desired signal. As a result, the first user 42 and third user 46 are clearly positioned to their respective directions. Furthermore possible echoes due to crosstalk are mitigated.

Figure 10:
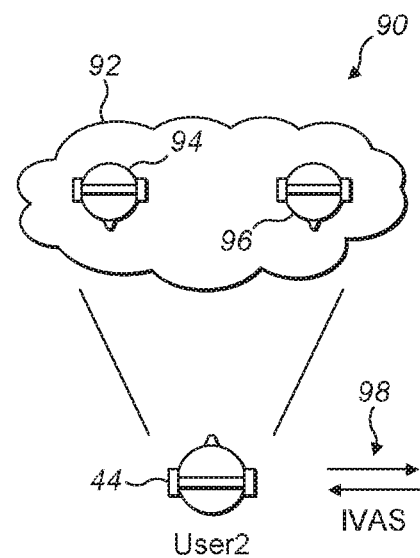

FIG. 10 is a block diagram of a system, indicated generally by the reference numeral 90, in accordance with an example embodiment.

The system 90 includes the second user 44. The second user 44 is provided with spatial audio data 92 including spatial audio data 94 for the first user 42 and spatial audio data 96 for the third user 46. The spatial audio data 92 is provided to the second user 44 using communication system 98 (such as an IVAS communication). Note that the spatial audio data 96 for the third user 46 is provided to the second user 44 by the first user 42 (with the first user 42 receiving that data from the third user 46). As discussed above, a single IVAS stream can be used, with two data objects (one for audio from the first user 42 and the other for audio from the third user 46). The IVAS decoder of the second user 44 binauralizes the audio of the first user 42 to the direction of the first user and binauralizes the audio of the third user 46 to the direction of the third user.

It is possible that the third user 46 may require an independent connection to the first and second users (rather than relying on a local link with the first user). This may be required, for example, if one or both of the first and second user moves so that a local link cannot be maintained.

Figure 11:
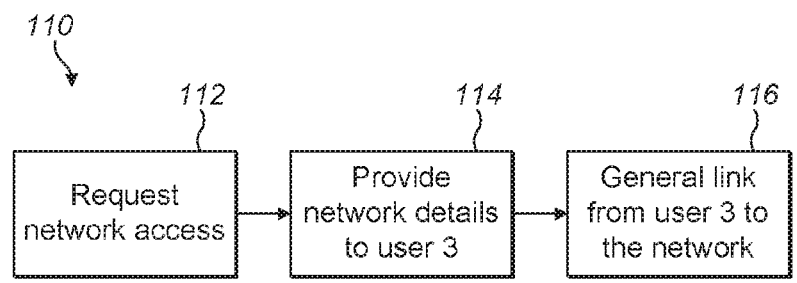
FIG. 11 is a flow chart showing an algorithm in accordance with an example embodiment.

FIG. 11 is a flow chart showing an algorithm, indicated generally by the reference numeral 110, in accordance with an example embodiment.

The algorithm 110 starts at operation 112 where access to the network is requested. For example, the third user 46 may indicate that he/she wants to join an IVAS call directly. This could be performed, for example, by clicking on a button in the IVAS call application. This could result in the sending of a request to the mobile devices of the first and second users 42 and 44. Either of those uses may accept the request (or both may be required to accept the request).

Once the third user 46 has been accepted to join the network, the algorithm 110 moves to operation 114 where details of the network (e.g. the IVAS network) over which the first and second users are communicating are provided to the third user. This information may, for example, include basic identification information and any associated passwords.

Finally, at operation 116, a link is generated between the third user and the network in order to start a separate call (such as a separate IVAS call). The mobile device of the first user continues its call as before, but stops feeding the second audio object (from the third user device) to the IVAS encoder. The mobile device of the second user 44 receives the same IVAS stream from the first user as before, now only containing the audio object of the first user, and binauralizes that audio stream as before. In addition, the mobile device of the third user 46 transmits the audio of the third user. The second user therefore receives audio for the third user in a separate IVAS stream and binauralizes that audio stream for output to the second user.

Figure 12:
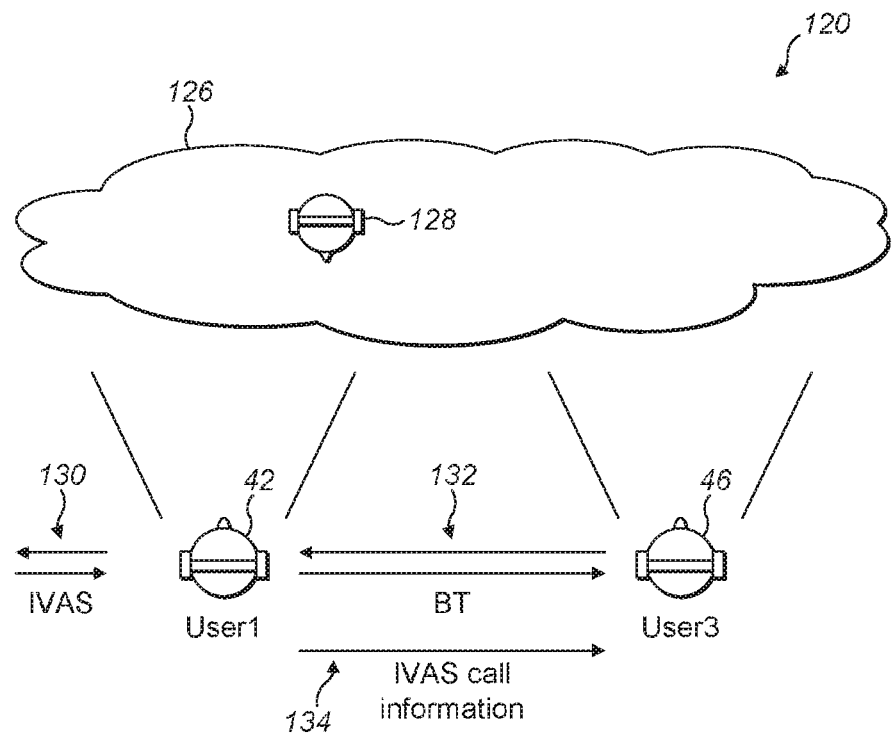
FIG. 12 is a block diagram of a system in accordance with an example embodiment.

FIG. 12 is a block diagram of a system, indicated generally by the reference numeral 120, in accordance with an example embodiment. The system 120 implements operation 114 of the algorithm 110 described above.

The system 120 comprises the first user 42 and third user 46 as described above. The first and third users both receive spatial audio data 126 including spatial audio data 128 for the second user 44. The spatial audio data is provided to the first user 42 using a first communication system 130 (such as an IVAS communication). The spatial audio data is provided from the first user 42 to the third user 46 via a local link 132 (such as a Bluetooth® link).

As described above, network details are provided to the third user 46 in operation 114 of the algorithm 110. This is indicated, in FIG. 12, by the IVAS call information 134 sent from the first user 42 to the third user 46.

Figure 13A:
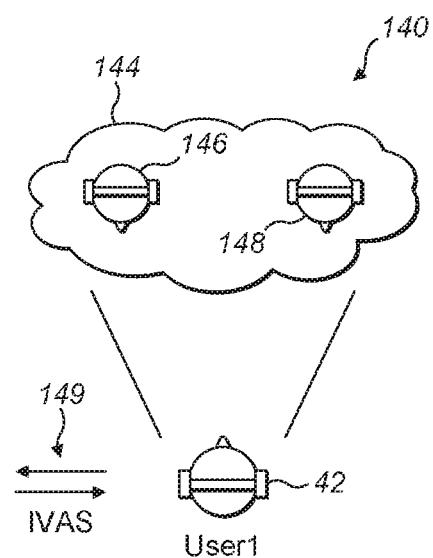
FIGS. 13a to 13c are block diagrams of systems in accordance with an example embodiment.
Figure 13B:
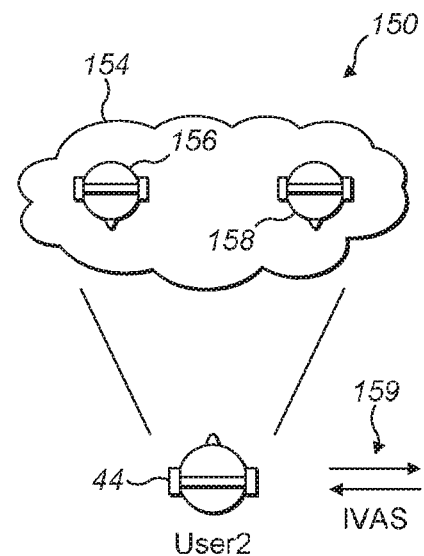
Figure 13C:
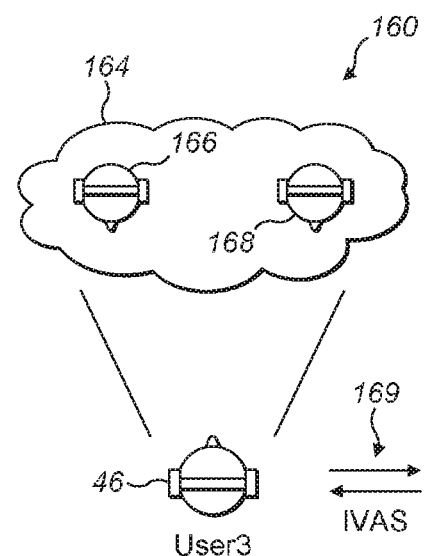

FIGS. 13a to 13c are block diagrams of systems, indicated generally by the reference numerals 140, 150 and 160 respectively, in accordance with an example embodiment.

The system 140 (shown in FIG. 13a) includes the first user 42. The first user 42 is provided with spatial audio data 144 including spatial audio data 146 for the second user 44 and spatial audio data 148 for the third user 46.

The system 150 (shown in FIG. 13b) includes the second user 44. The first user 44 is provided with spatial audio data 154 including spatial audio data 156 for the first user 42 and spatial audio data 158 for the third user 46.

The system 160 (shown in FIG. 13c) includes the third user 46. The third user 46 is provided with spatial audio data 164 including spatial audio data 166 for the first user 42 and spatial audio data 168 for the second user 44.

Figure 14:
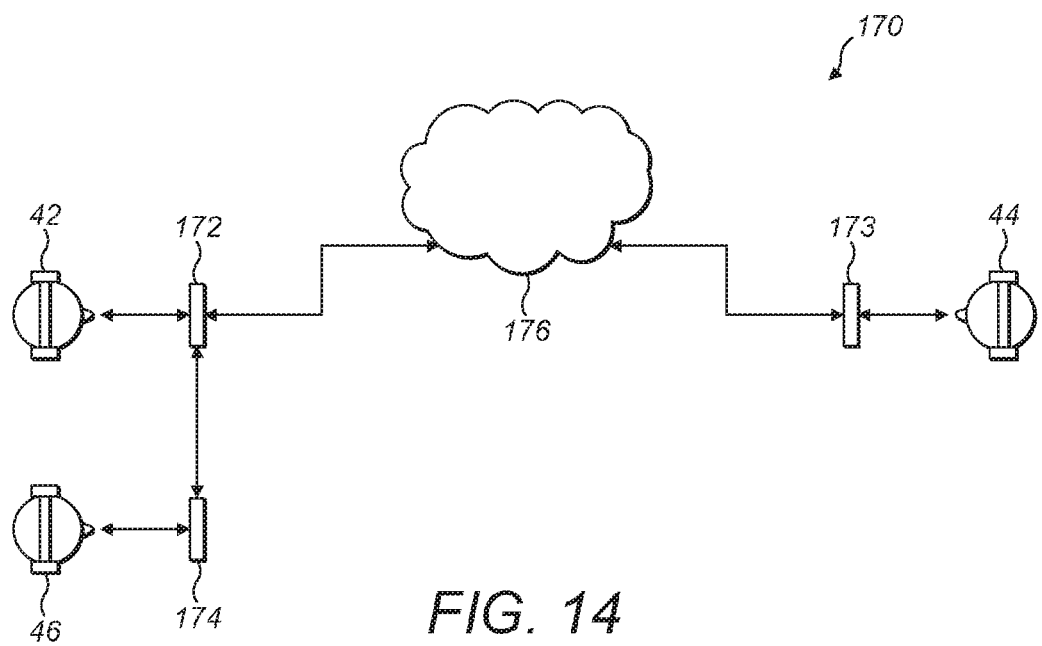
FIG. 14 is a block diagram of a system in accordance with an example embodiment.

FIG. 14 is a block diagram of a system, indicated generally by the reference numeral 170, in accordance with an example embodiment. The system 170 shows the scenario described above with reference to FIGS. 6 to 10 in which a first user 42 communicates with a second user 44 and a third user 46 joins the communication session. As shown in FIG. 14, the first user 42 uses a first communication device 172 to communicate with a second communication device 173 of the second user 44. The communications between the first and second communication devices take place over a network 176 (which may, for example, be a mobile communication network and/or the Internet). The third user 46 uses a third communication device 174 to communicate with the first communication device 172 using a local link.

Figure 15:
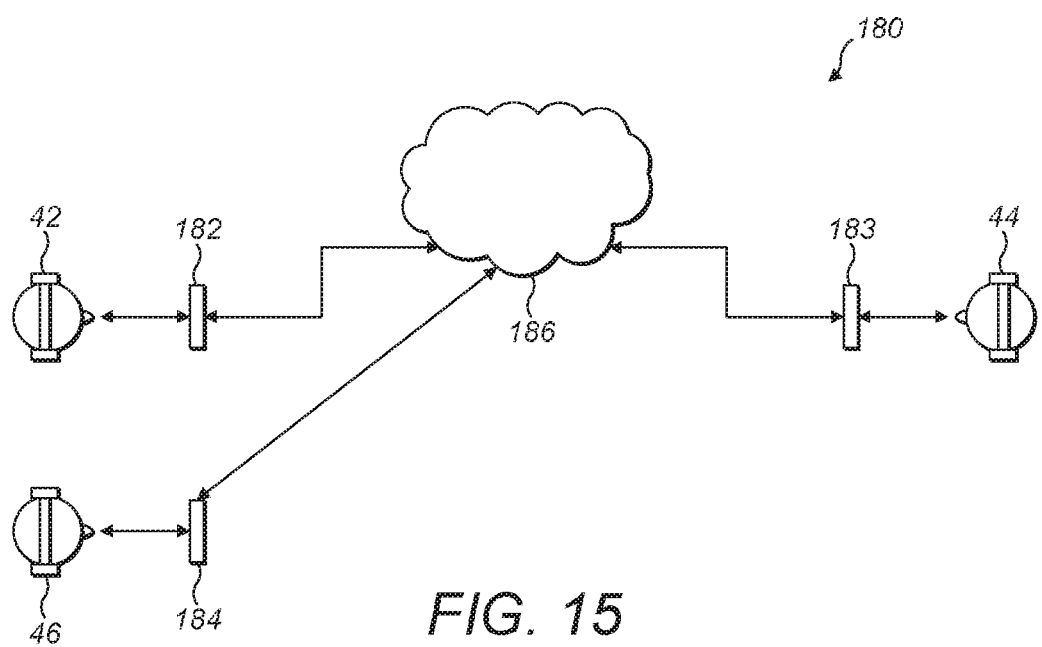
FIG. 15 is a block diagram of a system in accordance with an example embodiment.

FIG. 15 is a block diagram of a system, indicated generally by the reference numeral 180, in accordance with an example embodiment. The system 180 shows the scenario described above with reference to FIGS. 13a to 13c in which the first user 42 communicates with a second user 44 and a third user 46 joins the communication session. As shown in FIG. 15, the first user 42 uses a first communication device 182 to communicate with a second communication device 183 of the second user 44. The communications between the first and second communication devices take place over a network 186 (which may, for example, be a mobile communication network and/or the Internet). The third user 46 uses a third communication device 184 to communicate with the first and second communication devices 182 and 183 using the network 186.

Figure 16:
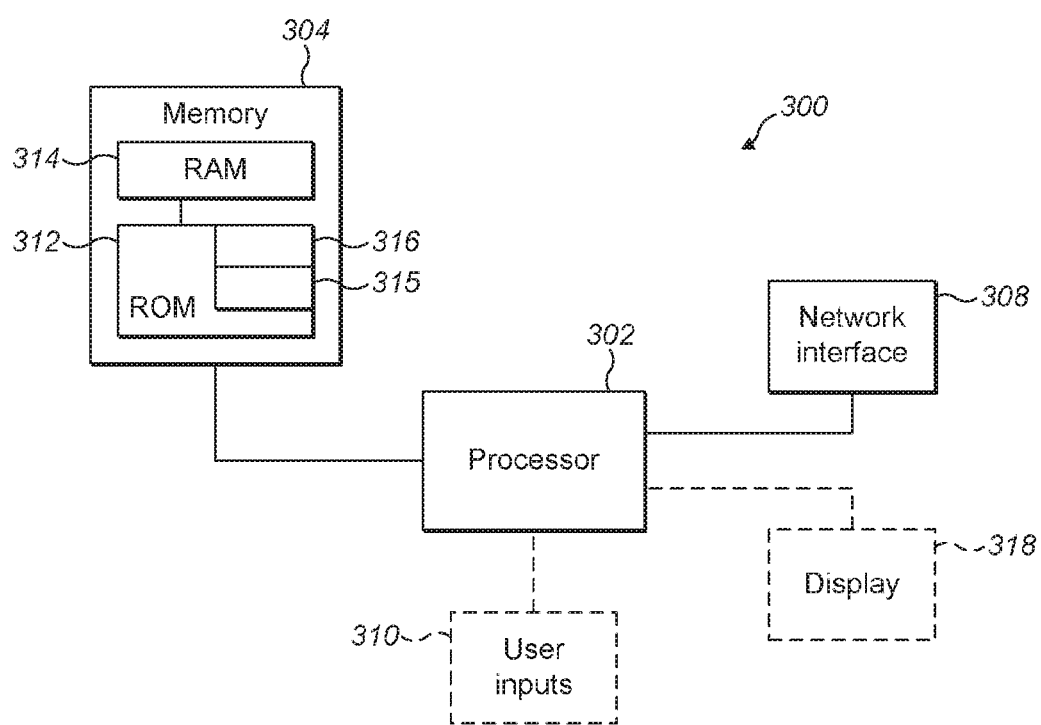
FIG. 16 is a block diagram of components of a processing system in accordance with an example embodiment.

For completeness, FIG. 16 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 60 or 110 described above.

The processor 302 may take any suitable form. For instance, it may be a microcontroller, a plurality of microcontrollers, a processor, or a plurality of processors.

The processing system 300 may be a standalone computer, a server, a console, or a network thereof.

In some example embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 17A:
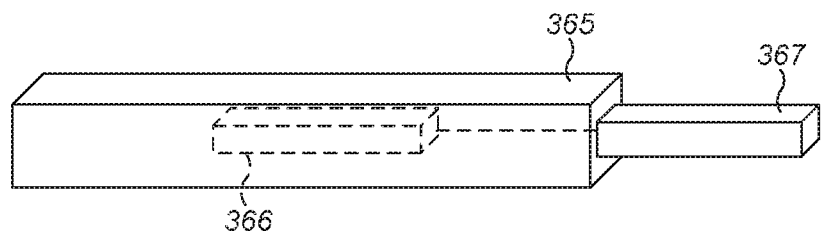
FIGS. 17a and 17b show tangible media, respectively a removable memory unit and a compact disc (CD) storing computer-readable code which when run by a computer perform operations according to embodiments.
Figure 17B:
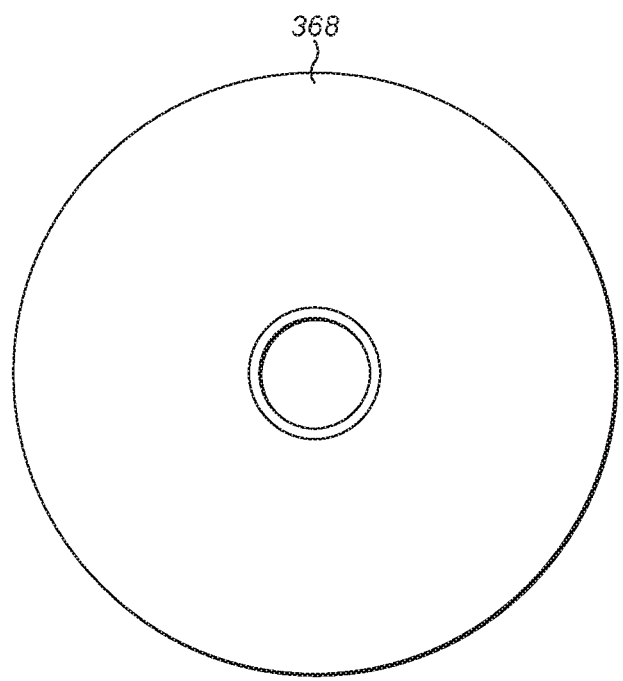

FIGS. 17a and 17b show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3, 6 and 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   circuitry at a first user device configured to enable a first user having the first user device to communicate with one or more second users having one or more second user devices via a network, wherein the first user and the one or more second users have respective spatial positions within a virtual space, wherein the virtual space comprises a plurality of users, wherein the plurality of users comprises, at least, the first user and the one or more second users wherein the plurality of users within the virtual space each have a respective relative spatial position relative to each other in the virtual space;
   circuitry at the first user device configured to provide spatial audio data from the first user device to the one or more second user devices and receive spatial audio data at the first user device from the one or more second user devices, such that the first user and the one or more second users are provided with audio from the one or more other users of the plurality of users in the respective relative spatial positions; and
   circuitry at the first user device configured to enable a third user having a third user device to communicate with the first user and the one or more second users via the first user device, wherein the circuitry configured to enable the third user to communicate is configured to:
   provide a local link between the first and third user devices,
   wherein the circuitry at the first user device configured to provide the spatial audio data from the first user device to the one or more second user devices is further configured to encode a single stream comprising:
   at least one first data object, wherein the at least one first data object comprises, at least, direction information for the first user and audio data for the first user, and
   at least one third data object, wherein the at least one third data object comprises, at least, direction information for the third user and audio data for the third user, wherein the audio data for the third user is received with the first user device from the third user device via the local link,
   wherein the at least one first data object is separate from the at least one third data object.

2. An apparatus as claimed in claim 1, wherein the circuitry at the first user device configured to provide the spatial audio data from the first user device to the one or more second user devices is further configured to generate the at least one third data object based, at least partially, on the audio data for the third user that is received with the first user device from the third user device via the local link.

3. An apparatus as claimed in claim 1, wherein the circuitry configured to enable the third user device to communicate is configured to provide a first handshaking protocol between the first and third user devices to initiate the local link.

4. An apparatus as claimed in claim 1, wherein the circuitry configured to enable the third user to communicate is configured to enable the third user to enter the virtual space, comprising presenting a virtual reality, augmented reality or mixed reality visualisation of the virtual space to the third user.

5. An apparatus as claimed in claim 1, further comprising circuitry at the first user device configured to:
   provide spatial audio data to the third user device such that the third user is provided with audio from other users in the virtual space in respective relative spatial positions; and
   provide the other users with audio from the third user from a relative spatial position of the third user.

6. An apparatus as claimed in claim 1, wherein the network comprises an IVAS network, wherein the single stream comprises a single IVAS stream.

7. An apparatus as claimed in claim 1, further comprising circuitry configured to receive spatial audio data at the first user device from the third user device, further configured to attenuate audio of the third user in the at least one first data object.

8. An apparatus as claimed in claim 1, further comprising:
   circuitry configured to track a position and/or an orientation of at least some of said plurality of users; and
   circuitry configured to adjust the respective relative spatial positions of the at least some of the plurality of users within the virtual space based, at least partially, on the tracked position and/or orientation.

9. An apparatus as claimed in claim 1, further comprising circuitry at the first user device configured to enable the third user to communicate with the first user and the one or more second users via the network.

10. An apparatus as claimed in claim 9, wherein the circuitry configured to enable the third user device to communicate with the first user and the one or more second users via the network is configured to provide a second handshaking protocol between the first and third user devices to initiate a link from the third user device to the network and/or to deactivate the local link between the first and third user devices.

11. An apparatus as claimed in claim 1, further comprising circuitry configured to provide additional audio content to some or all of the plurality of users from an additional spatial position within the virtual space.

12. An apparatus as claimed in claim 1, wherein the network is a mobile communications network and/or the Internet.

13. The apparatus as claimed in claim 1, further comprising:
   circuitry at the first user device configured to attenuate spatial audio data from the third user; and circuitry at the first user device configured to provide the attenuated spatial audio data from the third user to the one or more second user devices.

14. A non-transitory computer readable medium encoded with a computer program comprising instructions for causing an apparatus to perform at least the following:
enabling at least a first user having a first user device and one or more second users have one or more second user devices to communicate via a network, wherein the first user and the one or more second users have respective spatial positions within a virtual space, wherein the virtual space comprises a plurality of users, wherein the plurality of users comprises, at least, the first user and the one or more second users wherein the plurality of users within the virtual space each have a respective relative spatial position relative to each other in the virtual space;
providing spatial audio data from the one or more second user devices to the first user device and providing spatial audio data from the first user device to the one or more second user devices, such that the first user and the one or more second users are provided with audio from the one or more other users of the plurality of users in the respective relative spatial positions; and
enabling a third user having a third user device to communicate with the first user and the one or more second users via the first user device, wherein the enabling of the third user to communicate comprises:
providing a local link between the first and third user devices, wherein providing the spatial audio data from the first user device to the one or more second user devices comprises encoding a single stream comprising:
at least one first data object, wherein the at least one first data object comprises, at least, direction information for the first user and audio data for the first user, and
at least one third data object, wherein the at least one third data object comprises, at least, direction information for the third user and audio data for the third user, wherein the audio data for the third user is received with the first user device from the third user device via the local link,
wherein the at least one first data object is separate from the at least one third data object.

15. The non-transitory computer readable medium of claim 14, wherein enabling the third user to communicate comprises enabling the third user to enter the virtual space, comprising presenting a virtual reality, augmented reality or mixed reality visualisation of the virtual space to the third user.

16. The non-transitory computer readable medium of claim 14, wherein the computer program comprises instructions for causing the apparatus to perform:
tracking a position and/or an orientation of at least some of the plurality of users; and
adjusting the respective relative spatial positions of the at least some of the plurality of users within the virtual space based, at least partially, on the tracked position and/or orientation.

17. A method comprising:
enabling a first user having a first user device to communicate with one or more second users having one or more second user devices via a network, wherein the first user and the one or more second users have respective spatial positions within a virtual space, wherein the virtual space comprises a plurality of users, wherein the plurality of users comprise, at least, the first user and the one or more second users wherein the plurality of users within the virtual space have a respective relative spatial position relative to each other in the virtual space;
providing spatial audio data from the first user device to the one or more second user devices and receiving spatial audio data at the first user device from the one or more second user devices, such that the first user and the one or more second users are provided with audio from the one or more other users of the plurality of users in the respective relative spatial positions; and
enabling a third user having a third user device to communicate with the first user and the one or more second users via the first user device, wherein the enabling of the third user to communicate comprises:
providing a local link between the first and third user devices,
wherein providing the spatial audio data from the first user device to the one or more second user devices comprises encoding a single stream comprising:
at least one first data object, wherein the at least one first data object comprises, at least, direction information for the first user and audio data for the first user, and
at least one third data object, wherein the at least one third data object comprises, at least, direction information for the third user and audio data for the third user, wherein the audio data for the third user is received with the first user device from the third user device via the local link,
wherein the at least one first data object is separate from the at least one third data object.

18. The method of claim 17, wherein the enabling of the third user to communicate comprises:
enabling the third user to enter the virtual space, comprising presenting a virtual reality, augmented reality or mixed reality visualisation of the virtual space to the third user, and
enable the third user to enter the virtual space at a relative spatial position within the virtual space that the third user chooses.

19. The method of claim 17, further comprising:
tracking a position and/or an orientation of at least some of the plurality of users; and
adjusting the respective relative spatial positions of the at least some of the plurality of users within the virtual space based, at least partially, on the tracked position and/or orientation.

* * * * *